Oct. 30, 1928.
J. H. WHITLEY
1,689,706
COTTON SEED CONVEYER
Filed June 9, 1927
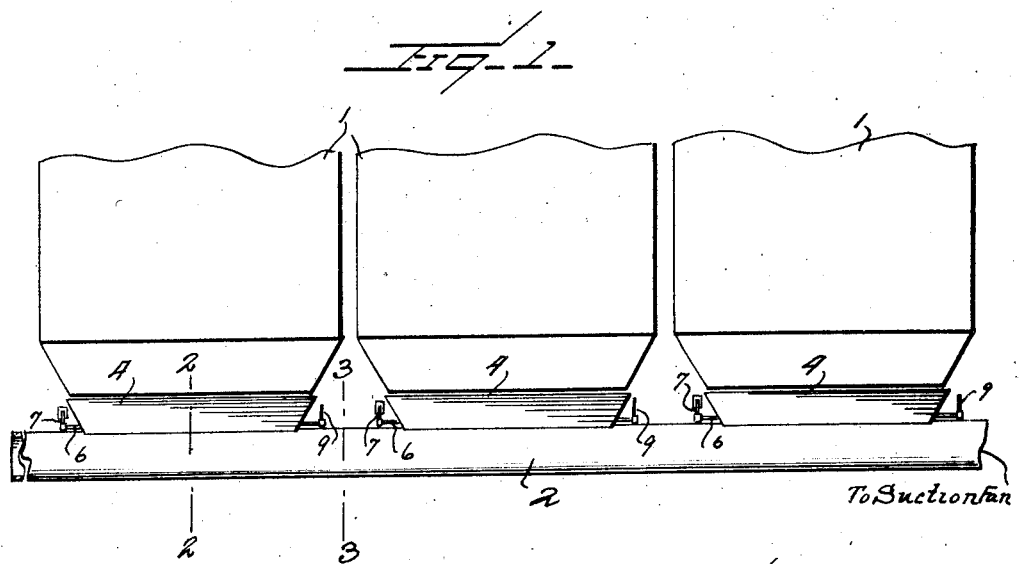
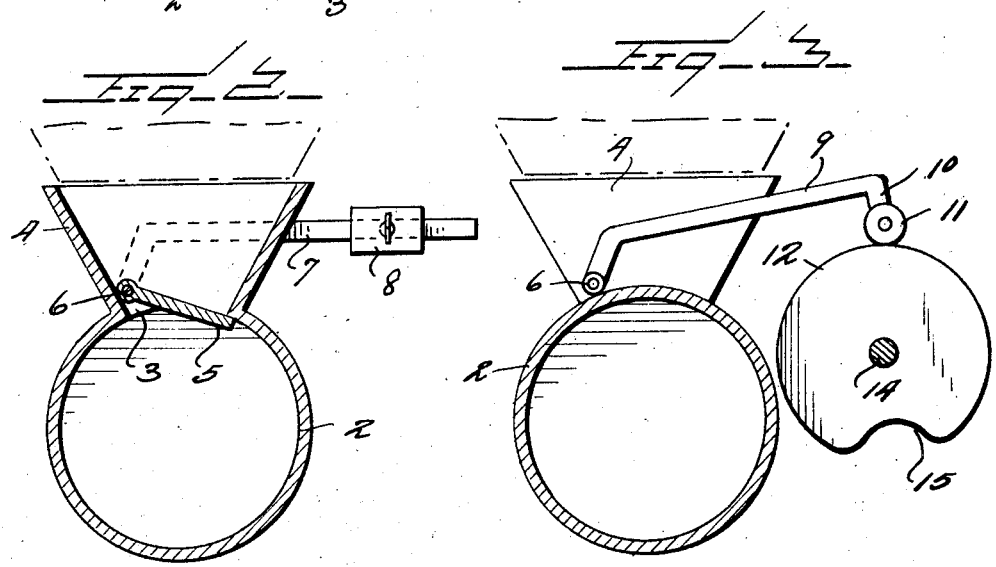
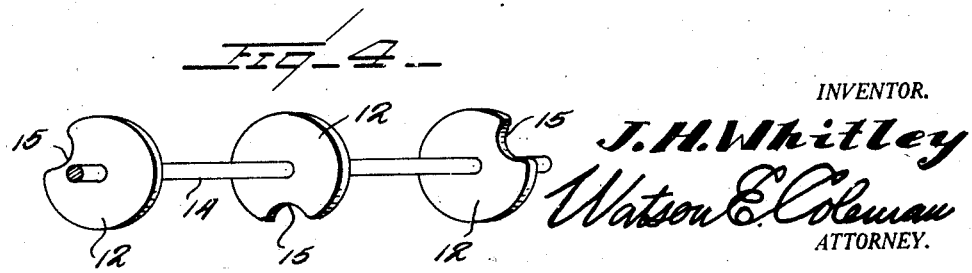
INVENTOR.
J. H. Whitley
Watson E. Coleman
ATTORNEY.

Patented Oct. 30, 1928.

1,689,706

UNITED STATES PATENT OFFICE.

JOHN H. WHITLEY, OF STANTONSBURG, NORTH CAROLINA.

COTTONSEED CONVEYER.

Application filed June 9, 1927. Serial No. 197,669.

This invention relates to cotton seed conveyers and it is an object of the invention to provide a device of this kind embodying a flue arranged below a gin or battery of gins through which the seed is carried off together with means for automatically controlling the discharge of the seed into the flue.

The invention also has for an object to provide a conveyer of this kind comprising a flue disposed below a battery of gins and into which said gins discharge together with means for controlling the discharge from the gins to the flue and in a manner whereby when one gin is discharging into the flue the discharges from the other gins are closed.

The invention consists in the details of construction and in the combination and arrangement of the several parts of my improved cotton seed conveyer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in elevation and of somewhat a diagrammatic character illustrating a cotton seed conveyer constructed in accordance with an embodiment of my invention;

Figure 2 is an enlarged fragmentary sectional view taken substantially on the line 2—2 of Figure 1;

Figure 3 is an enlarged fragmentary sectional view taken substantially on the line 3—3 of Figure 1;

Figure 4 is a fragmentary view in perspective and of a diagrammatic character illustrating cams for controlling the discharge from the gins to the flue.

As disclosed in the accompanying drawing, a battery of gins 1 have disposed therebelow a flue 2 leading to a suitable point of discharge and through which a suitable suction or blast is created to carry off the seed discharged within the flue from the batteries 1.

Below each of the batteries 1 the upper portion of the wall of the flue 2 is provided with an elongated opening 3 through which seed discharged from the battery is passed into the flue 2 and carried off therethrough. This opening 3 has its marginal portions defined by the upstanding walls 4 whereby a hopper is provided into which a gin 1 directly discharges.

The opening 3, is normally closed by a swinging valve 5 fixed to a shaft 6 supported by the end walls 4 and extending outwardly therebeyond. This shaft 6 is also positioned in close proximity to a side wall 4.

One extended portion of the shaft 6 is provided with a rock arm 7 on which is adjustably mounted a weighted member or poise 8. The opposite extended portion of the shaft 6 is provided with a second rock arm 9 having its outer extremity continued by a depending extension 10 carrying a roller 11.

The roller 11, due to the weight of the poise 8 and the weight of the seed within the hopper upon the valve 5, is maintained in close contact from above with a disc or cam member 12 fixed to a suitably driven shaft 14. This disc or cam member 12 at a predetermined point in its periphery is provided with a depression 15 so that as the disc or member 12 is rotating, the roller 11 will drop down into the depression 15 and thus permitting requisite swinging movement of the arm 9 to effect sufficient rotation of the shaft 6 to move the valve 5 into open position. When the valve 5 is in open position, the seed within the hopper will readily drop into the flue 2 and be carried off therethrough under the action of the suction or blast therein.

The shaft 14 is adapted to be supported in any desired manner in proper position with respect to the flue 2 and as is particularly illustrated in Figure 4, it is to be noted that the depressions 15 in the discs or members 12 are so positioned one with respect to the others that when one valve 5 is in open position the remainder of the valves will be closed. This is of decided advantage as it prevents the discharge of too large a quantity of seed within the flue 2 which would probably result in a clogging of the flue.

By having only one hopper at a time discharging within the flue 2 the efficiency of the conveying of the seed is maintained.

From the foregoing description it is thought to be obvious that a cotton seed conveyer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A pneumatic conveyer comprising a flue having an opening in its upper wall, said opening being defined by upstanding walls providing a hopper, a shaft supported by opposed walls of the hopper and extending through the hopper, a valve for the opening in the flue fixed to the shaft and opening into the flue, a rock arm carried by the shaft and providing means for constantly urging the valve into open position, a second arm carried by the shaft, a disc supported for rotation, said second arm having contact with the periphery of the disc, the periphery of said disc having a depression into which said arm extends upon rotation of the disc to permit the valve to move into open position, said valves being positively maintained shut by the engagement of the arm with the perimeter of the disk, except when said arm is released by the depression of the disk.

2. In combination with a plurality of cotton gins, a carry-off flue positioned therebelow, the upper wall of the flue having openings, one of said openings being positioned below each of the gins, valves for closing said openings, and means for intermittently moving said valves into open and closed position, said means positively maintaining the remainder of the valves closed when one of the valves is opened.

3. In combination with a plurality of cotton gins, a carry-off flue positioned therebelow, the upper wall of the flue having openings, one of said openings being positioned below each of the gins, valves for closing said openings, and means for intermittently moving said valves into open and closed position, said means positively maintaining the remainder of the valves closed when one of the valves is open, said means consisting of a roller operatively connected to the valve to move therewith rotatable shaft with cams mounted upon the shaft at predetermined points, each cam being associated with a gin, each cam being circular in form but having a single depression in the periphery thereof for the reception of said roller, thus allowing one valve to open, the depressions being in angular relation to each other so that all but one valve are positively maintained shut.

In testimony whereof I hereunto affix my signature.

JOHN H. WHITLEY.